United States Patent
Fay et al.

(10) Patent No.: US 7,621,193 B2
(45) Date of Patent: Nov. 24, 2009

(54) FRACTURE DETECTING STRUCTURAL HEALTH SENSOR

(75) Inventors: Matthew K. Fay, Wentzville, MO (US); Gregory L. Sheffield, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/941,307

(22) Filed: Nov. 16, 2007

(65) Prior Publication Data

US 2009/0126471 A1  May 21, 2009

(51) Int. Cl.
*G01N 19/00* (2006.01)
(52) U.S. Cl. .................................................. 73/865.9
(58) Field of Classification Search ................ 73/864.9, 73/71.1, 768, 767, 799, 802; 200/61.08
See application file for complete search history.

(56) References Cited

U.S. PATENT DOCUMENTS

| | | | | |
|---|---|---|---|---|
| 4,087,800 | A * | 5/1978 | Lee | 340/676 |
| 4,587,517 | A * | 5/1986 | Engstrom et al. | 340/542 |
| 5,936,525 | A * | 8/1999 | Leyden et al. | 340/568.2 |
| 7,132,943 | B2 * | 11/2006 | Nelson | 340/551 |
| 7,231,826 | B2 | 6/2007 | Bossi et al. | |
| 7,333,898 | B2 | 2/2008 | Griess et al. | |
| 7,388,166 | B2 * | 6/2008 | Marmaropoulos et al. | 200/52 R |
| 7,434,480 | B2 | 10/2008 | Georgeson et al. | |
| 2002/0145529 | A1 * | 10/2002 | Kuzik et al. | 340/676 |
| 2006/0144997 | A1 * | 7/2006 | Schmidt et al. | 244/100 R |
| 2007/0125189 | A1 | 6/2007 | Bossi et al. | |
| 2007/0144272 | A1 * | 6/2007 | Yu et al. | 73/862.046 |
| 2007/0252718 | A1 * | 11/2007 | Ray | 340/679 |
| 2008/0109187 | A1 | 5/2008 | Kollgaard et al. | |
| 2008/0163670 | A1 | 7/2008 | Georgeson | |

(Continued)

FOREIGN PATENT DOCUMENTS

JP  1054244  8/1987

(Continued)

OTHER PUBLICATIONS

Greene, "Sensors Without Batteries," http://www.technologyreview.com/read_article.aspx? id=16864&ch=infotech&a=f, Technology Review Published by MIT, May 15, 2006.

(Continued)

*Primary Examiner*—Hezron Williams
*Assistant Examiner*—Gunnar J Gissel
(74) *Attorney, Agent, or Firm*—Bradley K. Lortz; Canady & Lortz LLP

(57) ABSTRACT

A sensor device for monitoring and testing the integrity of structural elements is disclosed. A frangible membrane including a thin breakable conductor sense loop is bonded to a structural element to be tested. A fracture in the bonded structural element induces a disruption in the both the frangible membrane and the thin breakable conductor sense loop. Measured electrical property change of the disrupted conductor sense loop reveals the fracture in the structural element. Connection to the sensor device may be through a connector or using a wireless reader which remotely energizes the sensor device. The sensor may also be implemented as a gasket and/or employ weep holes to the breakable conductor to reveal possible corrosion as well.

18 Claims, 8 Drawing Sheets

U.S. PATENT DOCUMENTS

2008/0167833 A1 7/2008 Matsen et al.
2008/0223152 A1 9/2008 Georgeson et al.

FOREIGN PATENT DOCUMENTS

| JP | 2005055331 | 8/2003 |
|---|---|---|
| JP | 2007292747 | 3/2006 |
| WO | WO94/09354 | 4/1994 |

OTHER PUBLICATIONS

Eckfeldt, "What Does RFID Do for the Consumer?," Comm. of the ACM, Sep. 2005, vol. 48, No. 9, pp. 77-79.
Gunther et al., "RFID and the Perception of Control: The Consumer's View," Comm. of the ACM, Sep. 2005, vol. 48, No. 9, pp. 73-76.
Ohkubo et al., "RFID Privacy Issues and Technical Challenges," Comm. of the ACM, Sep. 2005, vol. 48, No. 9, pp. 66-71.
Hsi et al., "RFID Enhances Visitors' Museum Experience at the Exploratorium," Sep. 2005, vol. 48, No. 9, pp. 60-65.
Pering et al., "Spontaneous Marriages of Mobile Devices and Interactive Spaces," Sep. 2005, vol. 48, No. 9, pp. 53-59.
Sample et al., "Design of an RFID-Based Battery-Free Programmable Sensing Platform," IEEE Trans. on Instr. and Meas., vol. 57, No. 11, Nov. 2008, pp. 2608-2615.
Raskar et al., "Photosensing Wireless Tags for Geometric Procedures," Sep. 2005, vol. 48, No. 9, pp. 46-51.
Smith et al., "RFID-Based Techniques for Human-Activity Detection," Sep. 2005, vol. 48, No. 9, pp. 39-44.
Borriello, "RFID: Tagging the World," Sep. 2005, vol. 48, No. 9, pp. 34-37.
UK Patent Application No. GB0820180.8 Combined Search and Examination Report, Mar. 2, 2009, pp. 1-5.

* cited by examiner

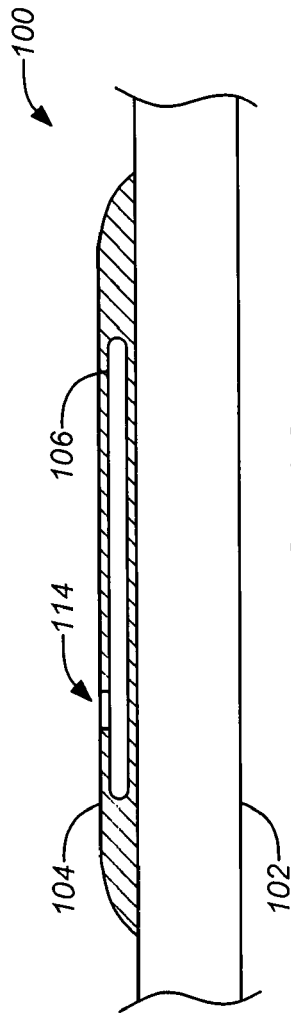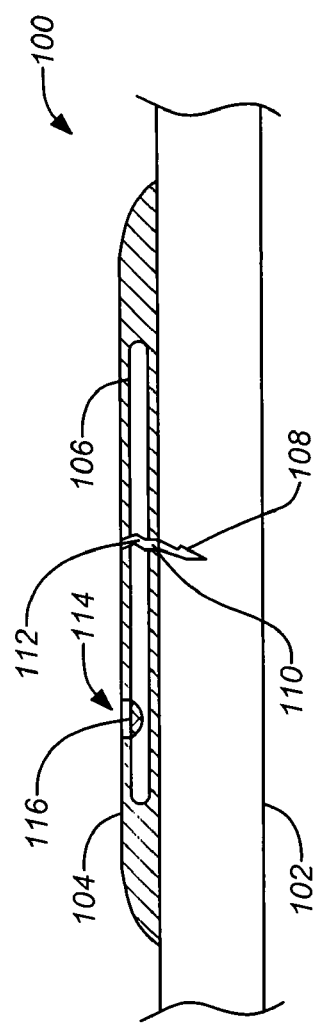

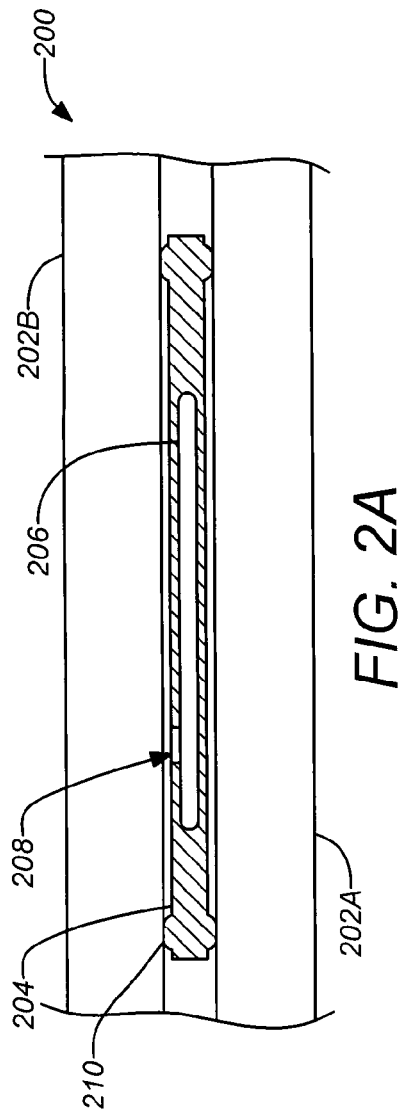
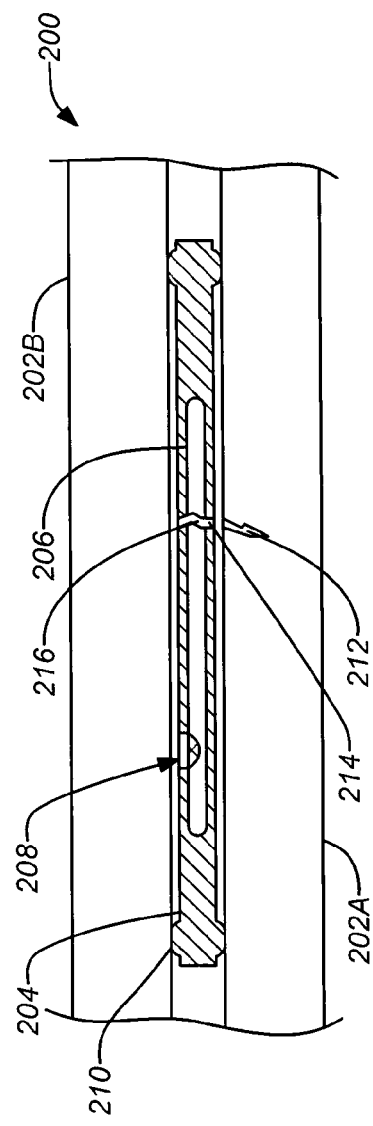

FRACTURE DETECTING STRUCTURAL HEALTH SENSOR

CROSS-REFERENCE TO RELATED APPLICATIONS

This application is related to U.S. patent application Ser. No. 11/941,367, by Fay et al. filed on this same day, and entitled "CORROSION DETECTING STRUCTURAL HEALTH SENSOR".

BACKGROUND OF THE INVENTION

1. Field of the Invention

This disclosure relates to structural testing. Particularly, this disclosure relates to techniques for monitoring the integrity of structural elements over time in service.

2. Description of the Related Art

The need to monitor the integrity of structural elements arises in many different applications. For example, it is necessary to monitor the structures of aircraft. The aircraft stay in service for many years and may experience environments that may exceed design limits resulting in different failure modes, e.g., fatigue, fracture, corosion. Therefore, it is necessary to regularly check the structural integrity of the vehicle as part of any prudent maintenance program. Similarly, other types of structures may also require regular monitoring. Highway structures such as overpasses and bridges must be regularly checked. Some building structures may also require regular testing. Conventional testing techniques such as visual inspection, x-ray, dye penetrant, and electrical field techniques (e.g., eddy current testing, etc.) for testing structural elements have many drawbacks.

Visual inspection of structural members often requires some degree of disassembly of the structure. This adds greatly to the overall testing cost. For example, visual inspection for aircraft structures requires substantial disassembly of structure and removal of installed equipment in order to provide the access needed to view the areas of interest at a distance adequate to detect corrosion visually.

X-Ray testing, under the broader heading of radiographic testing, requires specialized facilities and government licenses. The technique employs the ability of short wavelength electromagnetic radiation to penetrate various materials. Either an X-ray machine or a radioactive source can be used as a source of photons. Because the amount of radiation emerging from the opposite side of an examined material can be detected and measured, variations in the intensity of radiation are used to determine thickness or composition of material and reveal any defects. Due to safety issues, X-ray testing also typically requires a complete work stoppage on all other tasks while the testing is being performed.

Dye penetrant testing is also time consuming and messy. Dye penetrant inspection is used to reveal surface breaking flaws through the bleedout of a colored or fluorescent dye from the flaw. The technique is based on the ability of a liquid to be drawn into a surface breaking flaw by capillary action. After a period of time, excess surface penetrant is removed and a developer is applied. This acts as a blotter. It draws the penetrant from the flaw to reveal its presence. The consituent penetrant and developer may and their by-products may be identified as hazardous (HAZMAT), requiring costly disposal means.

Finally, inspection methods using the application of electrical fields (e.g., eddy current testing, etc.) are exceptionally time consuming and difficult to read reliably in this type of application and may require alterations to structure. In typical eddy current testing for example, a circular coil carrying an AC current is placed in close proximity to an electrically conductive specimen to be tested. The alternating current in the coil yields a changing magnetic field, which interacts with the test object and induces eddy currents in it. Variations in the phase and magnitude of these eddy currents can be monitored using a second coil, or by measuring changes to the current flowing in the primary coil. The presence of any flaws or variations in the electrical conductivity or magnetic permeability of the test object, will cause a change in eddy current flow and a corresponding change in the phase and amplitude of the measured current. The technique is generally limited to detecting surface breaks or near surface cracking and variations in material composition.

In view of the foregoing, there is a need in the art for apparatuses and methods for efficiently monitoring the integrity of structural elements. In particular, there is a need for such apparatuses and methods to monitor structural elements without requiring time-consuming disassembly. There is also a need for such apparatuses and methods to be light weight and inexpensive to use. There is particularly a need for such systems and apparatuses in aircraft applications. Theses and other needs are met by the present disclosure as detailed hereafter.

SUMMARY OF THE INVENTION

A sensor device for monitoring and testing the integrity of structural elements is disclosed. A frangible membrane including a thin breakable conductor sense loop is bonded to a structural element to be tested. A fracture in the bonded structural element induces a disruption in the both the frangible membrane and the thin breakable conductor sense loop. Measured electrical property change of the disrupted conductor sense loop reveals the fracture in the structural element. Connection to the sensor device may be through a connector or using a wireless reader which remotely energizes the sensor device. The sensor may also be implemented as a gasket and/or employ weep holes to the breakable conductor to reveal possible corrosion as well.

A typical sensor embodiment of the invention comprises a frangible non-conductive material, a breakable conductor sense loop within the frangible non-conductive material, the sense loop having ends, and a connecting device coupled to the ends of the breakable conductor sense loop. The frangible non-conductive material is disposed adjacent to a structure surface such that the breakable conductor sense loop is disrupted with a fracture in the structure surface and is sensed through the connecting device to indicate the fracture in the structure surface. Typically, the breakable conductor sense loop and the structure surface comprise a common material. In some cases, the frangible non-conductive material may be constructed as two layers sandwiching the breakable conductor sense loop.

In addition, the frangible non-conductive material may further include one or more weep holes each exposing a portion of the breakable conductor sense loop. In some embodiments of the invention, the breakable conductor sense loop may be disposed with a section length along an edge of the structure surface, i.e., in a location most likely to exhibit a fracture. For example, the breakable conductor sense loop may be routed around a fastener hole in the structure surface.

In some embodiments, the frangible non-conductive material may be bonded to the structure surface. In other embodiments, the frangible non-conductive material may be disposed between the structure surface and a second structural surface, e.g. as a gasket. In this case, the frangible non-conductive material may include one or more sealing ribs against the structure surface and/or a second structural surface.

In further embodiments of the invention, the connecting device may comprise a wireless communications tag. In this manner, testing can be performed under a much more efficient process as no physical connection to the sensor is required.

In a similar manner, a typical method embodiment of the invention for sensing structural integrity comprises the steps of disposing a frangible non-conductive material having a breakable conductor sense loop within the frangible non-conductive material adjacent to a structure surface, disrupting the breakable conductor sense loop with a fracture in the structure surface, and sensing the disruption in the breakable conductor sense loop breaks through a connecting device coupled to ends of the breakable conductor sense loop to indicate the fracture in the structure surface. Method embodiments of the invention may be further modified consistent with the apparatuses described herein.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Referring now to the drawings in which like reference numbers represent corresponding parts throughout:

FIG. 1A illustrates a side view of an exemplary membrane fracture sensor installed on a structural element;

FIG. 1B illustrates a side view of an exemplary membrane fracture sensor indicating a structural failure;

FIG. 2A illustrates a side view of an exemplary gasket fracture sensor;

FIG. 2B illustrates a side view of an exemplary gasket fracture sensor indicating a structural failure;

DETAILED DESCRIPTION OF THE PREFERRED EMBODIMENT

1. Overview

Figure 1C:
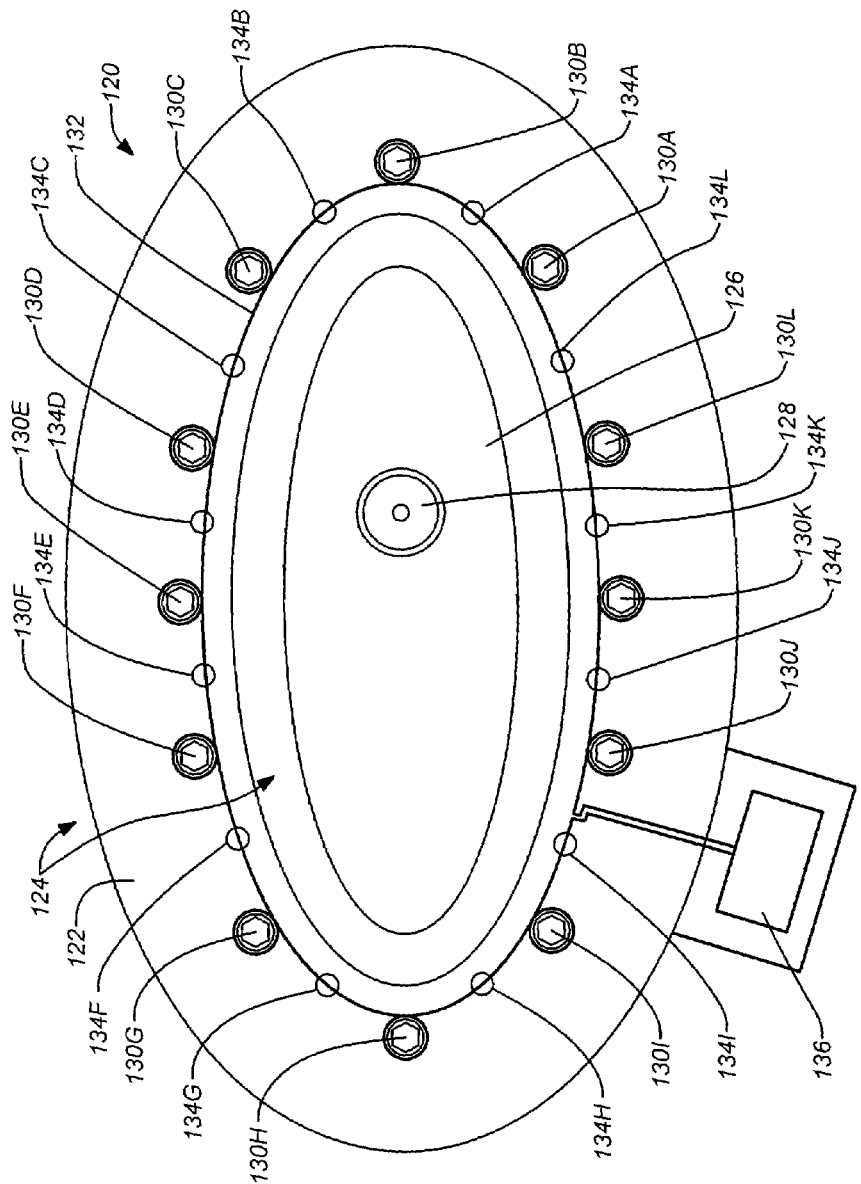
FIG. 1C illustrates a top view of an exemplary membrane fracture sensor.

As previously mentioned, embodiments of the invention are directed to a technique for detecting a discontinuity caused by a defect (e.g., a fracture) in a structural element. The structural element may be any material, e.g. metallic or composite. The sensor comprises a frangible membrane with an embedded breakable conductor sense loop. The membrane is bonded to a structural element such that a fracture in the structural element produces a corresponding fracture in the membrane and a break in the breakable conductor. Connection to the sense loop can be made through an ordinary electrical connector or a wireless communication tag.

Thus, a bonded structural health membrane sensor can detect hidden fractures and other structural damage without any component or structural disassembly. In the absence of damage severe enough to require repair, embodiments of the invention eliminate any required disassembly of components or structures as would otherwise be required to perform routine visual inspections. Further, embodiments of the invention do not require special facilities, training or government licenses. Embodiments of the invention also provide a quicker process for determining whether structural defects are present without interrupting other work in progress.

The membrane sensor effectively becomes a part of the structure on which it is installed. The sensor can provide the user with corrosion and/or damage status in a quick and reliable way. The sensor does not require special facilities, tools, training or equipment to operate. In some implementations, a wireless reader may be used to provide RF signals for energizing circuitry, controlling functionality, and receiving data. The sensor can provide detection capability without the need to remove the installed unit from of service for extended lengths of time, in the absence of corrosion or damage severe enough to require repair. In contrast, conventional techniques for inspecting structures are all exceptionally time consuming and expensive.

Thus, a structural health gasket sensor in accordance with the disclosure can lower the total cost of ownership based on the labor it can save and the additional equipment availability it can provide. Operators will not have to take equipment out of service, provided that there are no incidents of damage that need to be repaired. In contrast, conventional methods require copious labor and extended periods out of service to accomplish—even if no repairs are required. Conventional methods also enhance the risk of maintenance induced damage during the disassembly required for access.

2. Membrane Fracture Sensor

FIG. 1A illustrates a side view of an exemplary frangible membrane sensor 100 installed on a structural element 102. The sensor 100 comprises a frangible material 104 formed into a thin flat structure that is disposed adjacent to the surface of the structural element 102. Typically the frangible material is bonded to the structural element. A breakable conductor sense loop 106 is embedded within the frangible material 104. The frangible material 104 must be non-conductive so as not to short the breakable conductor sense loop 106 which is employed to detect a fracture or other structural failure in the surface of the structural element 102. The frangible material 104 may also include one or more weep holes 114 which penetrate to expose the breakable conductor sense loop 106. However, this structure is more suited for detecting fractures rather than corrosion because the weep holes 114 remain exposed rather than in a normally sealed environment such as with the gasket structure described hereafter.

FIG. 1B illustrates a side view of the exemplary frangible membrane sensor 100 indicating a structural failure. A fracture 108 appearing in the surface of the structural element 102 induces a break 110 in the frangible material 104 which in turn carries through to cause a break 112 in the breakable conductor sense loop 106. In addition to fracture detection, the frangible membrane sensor 100 may also optionally incorporate one or more weep holes 114 to be used in corrosion detection.

Any corrosion that develops in weep holes 114 in the frangible material 104 will effect the breakable conductor sense loop 106 as well. The conductor material may be selected to be susceptible to corrosion so that any moisture that comes in contact with the area will enter the weep hole 114 and cause at least a partial reduction of the exposed portion of the breakable conductor sense loop 106. This will result in an increase in the effective resistance of the conductor as the cross sectional area of the conductor is reduced by the corrosion. Thus, although actual corrosion of the structural element 102 may not yet exist, the weep hole 114 allows the conductor sense loop 106 to provide an early warning of possible corrosion to the structural element due to the presence of moisture. It should be noted that design of the breakable conductor sense loop 106 may be optimized such that the portions of the breakable conductor sense loop 106 may be treated differently or comprise a different material than the unexposed portions of the breakable conductor sense loop 106 to enhance the corrosion sensitivity in this area. The ends of the breakable conductor sense loop 106 are connected to a connecting device which is coupled to a sensing circuit that detects the fracture or corrosion as illustrated in the following FIG. 1C.

FIG. 1C illustrates a top view of an exemplary frangible membrane sensor 120. In this example, the frangible membrane 122 is applied to the surface of a structural element 124 that is the metal skin of an aircraft at a location that has an antenna base 126 mounted. The airfoil 126 carries the antenna connector 128 within it and is bolted to the aircraft skin (structural element 124) by a series of bolts 130A-130L around the perimeter of the antenna base 126. The breakable conductor sense loop 132 is embedded within the frangible membrane 122 as previously described and takes a route around the perimeter of the antenna base 126 where any structural failures are likely to appear. Accordingly, the breakable conductor sense loop 132 is routed around each of the bolts 130A-130L in small loops. Finally, there are also weep holes 134A-134L at various locations along the breakable conductor sense loop 132 which operate as previously described to provide an early warning of corrosion.

The breakable conductor sense loop 132 of the sensor 120 is coupled to a connecting device 136 which is used to connect to a reader device that measures changes in the electrical properties of the breakable conductor sense loop 132 (e.g., resistance increase indicating corrosion or an open circuit indicating a fracture). In the simplest implementation, the connecting device 135 may comprise a simple electrical connector. However, the connecting device 135 may also comprise a wireless communication tag as described hereafter which affords many advantages beyond a simple electrical connector. The reader device can be any known device capable of measuring the electrical properties of the breakable conductor sense loop 132. The wireless communication tag incorporates some of the reader device with the tag.

In one example, the frangible membrane may be constructed from two layers of thin plastic frangible film which contains the one or more fine wire sense loops sandwiched between. The frangible membrane material may be curable such that it is flexible prior to installation, but becomes rigid and brittle when fully cured. As previously described, when damage, such as a crack occurs on the underlying structure, the frangible membrane cracks as well, breaking the wire sense loop at the location of the damage. The frangible membrane is a non-conductive material that is self adhesive at installation and effectively seals and protects the underlying structure from corrosion.

Weep holes in the top membrane layer can permit the breakable conductor sense loop to detect corrosion. The membrane may be installed at structural locations where cracks and/or corrosion are a concern, such as fastener holes and cutouts in pressurized structure. At appropriate intervals, an operator uses a reader device to energize and read the membrane. Either a wireless reader device or another external device may be used to compare the readings of a sense loop to those of a reference value measured at each specific installation to determine if corrosion or damage is present. The reference value can be determined when the membrane or gasket sensor is designed for a specific application and manufactured. The reference value for the specifice application can either exist in written form for manual measurement and analysis or be loaded into the wireless reader for automatic analysis.

The frangible membrane material is typically non-porous and frangible (brittle) after installation. The objective is that the composition of the frangible membrane should match the structure material it is bonded to such that if a crack occurs in the structural element, the frangible membrane cracks as well, breaking the conductor which forms the sense loop. The frangible membrane may be either a pre-formed device or fabricated on site. The frangible membrane material should be an effective electrical insulator and flexible enough prior to installation to permit ease of installation. The frangible membrane material should have good shelf-life quality to permit stocking of spares. The frangible membrane material must be non-corrosive, particularly to the breakable conductor sense loop. The frangible membrane and sense loop materials and sizes and electrical measurement characteristics can be selected for a specific installation to maximize membrane performance. Materials for the frangible membrane may have characteristics similar to paint coatings in appearance and include, but are not limited to polycarbonate, urethane, polyurethane, enamel, polyester, acrylic, epoxy, and a wide variety of plastics and other similar materials.

The sense loop may be custom tailored to the specific application. It can typically be constructed from the same material (e.g., base metal and alloy) as the structural element at the installed interface. The configuration and size of the sense loop should be appropriate to ensure the conductor breaks when and if the membrane breaks. Materials for the sense loop include, but are not limited to aluminum, steel, copper, magnesium, titanium, and other similar materials. A membrane sensor device may also be implemented in a gasket configuration as described in the next section.

3. Gasket Fracture Sensor

FIG. 2A illustrates a side view of an exemplary frangible gasket sensor 200. The sensor 200 comprises a frangible material 204 formed into a thin flat structure that is disposed adjacent to the surface of two structural elements 202A, 202B. In this case, the frangible material is sandwiched between the structural elements 202A, 202B. A breakable conductor sense loop 206 is embedded within the frangible material 204. Here also, the frangible material 204 must be non-conductive so as not to short the breakable conductor sense loop 206 employed to detect a fracture or other structural failure in the surface either of the structural elements 202A, 202B. The frangible material 204 may also include one or more weep holes 208 which penetrate to expose the breakable conductor sense loop 206. Thus, the conductor sense loop 206 can be used to provide early detection of corrosion as previously described. The gasket configuration of the sensor 200 can also include one or more ribs 210 built into one or both sides of the frangible material 204. The ribs 210 are designed to provide a seal against one or both surfaces of the structural elements 202A, 202B.

FIG. 2B illustrates a side view of the exemplary gasket sensor 200 indicating a structural failure. A fracture 212 appearing in the surface of at least one structural element 202A induces a disruption 214 in the frangible material 204 which in turn carries through to cause a disruption 216 in the breakable conductor sense loop 206. Excessive corrosion that may develop in the weep holes 208 in the frangible material 204 may also cause a disruption in the breakable conductor sense loop 206 as well. Typically, the detected disruption in the breakable conductor sense loop 206 is a break (which may be a complete break or a partial break through the breakable conductor sense loop 206). However, any variation in the measured electrical properties of the breakable conductor sense loop 206, (e.g., an increase in resistance) may also be employed to detect the disruption and indicate a fracture or other problem in the underlying structure.

As previously described, the conductor material may be selected to be susceptible to corrosion so that any moisture that comes in contact with the area will enter the weep hole 208 and cause at least a partial erosion of the conductor. This will result in an increase in the effective resistance of the conductor as the cross sectional area of the conductor is reduced by the corrosion. Thus, although actual corrosion of the structural elements 202A, 202B may not exist yet, the weep hole 208 allows the conductor sense loop 206 to provide an early warning of possible corrosion to the structural element due to the presence of moisture. It should be noted that the gasket configuration is particularly well suited for early corrosion detection because the both surfaces of the frangible material 204 are intended to remain sealed from the environment (with or without the sealing ribs 210). Thus, any moisture present in the weep holes 208 would not be evident even under a visual inspection. Finally, the ends of the breakable conductor sense loop 106 are connected to a connecting device which is coupled to a sensing circuit that detects the fracture or corrosion in FIG. 2C.

Figure 2C:
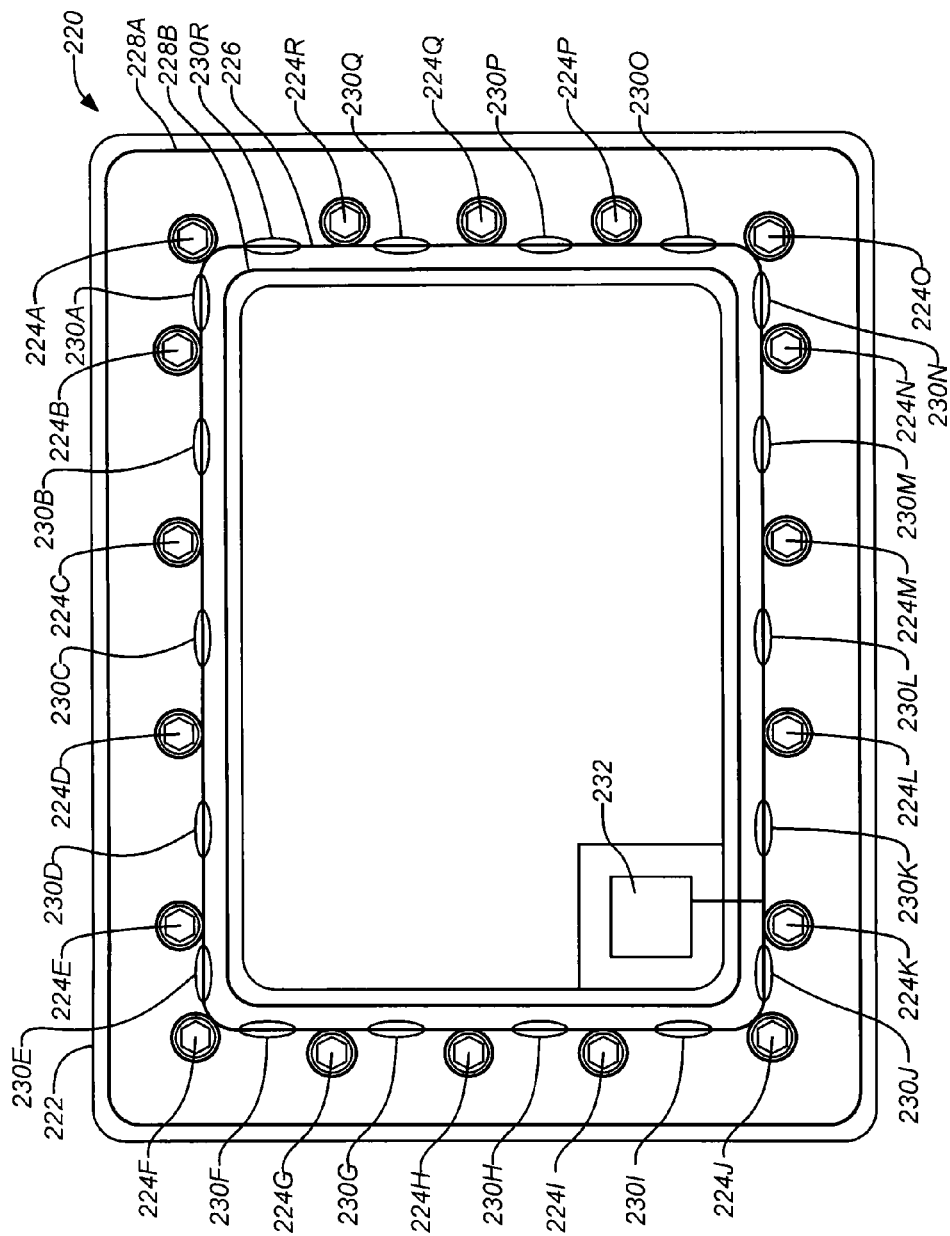
FIG. 2C illustrates a top view of an exemplary gasket fracture sensor.

FIG. 2C illustrates a top view of an exemplary sensor 220. Communication with the sensor 220 may be accomplished using any known technique. In this configuration, a frangible membrane 222 is sandwiched between the surface of two structural elements as described in FIGS. 2A and 2C. For example, the structural elements may be a joint between two components of an aircraft. A series of bolts 224A-224R are disposed around the interface between the structural elements. The breakable conductor sense loop 226 is embedded within the membrane 222 as previously described and is routed around the interface as well. The breakable conductor sense loop 226 is laid perpendicular to where any structural failures are likely to appear. Accordingly, the breakable conductor sense loop 226 is routed around each of the bolts 224A-224R in small loops. In addition, there are also weep holes 230A-230R at various locations along the breakable conductor sense loop 226 which operate as previously described to provide an early warning of corrosion. Ribs 228A, 228B are also laid out around the perimeter of both the inner and outer edges of the gasket membrane 222 (on one or both sides of the membrane as previously described in FIGS. 2A and 2B) to seal the membrane surface and the structural element surfaces from moisture.

The breakable conductor sense loop 226 of the gasket sensor 220 is coupled to a connecting device 232 which is used to connect to a reader device that measures changes in the electrical properties of the breakable conductor sense loop 226 (e.g., resistance increase indicating corrosion or an open circuit indicating a fracture). The reader device can be any known device capable of measuring the electrical properties of the breakable conductor sense loop 226. In a simple implementation, the connecting device 232 may comprise an electrical connector. However, the connecting device 232 may also comprise a wireless communication tag as described in the next section which affords many advantages beyond a simple electrical connector. The wireless communication tag incorporates some of the reader device with the tag.

4. Wireless Communication with Sensor

Figure 3A:
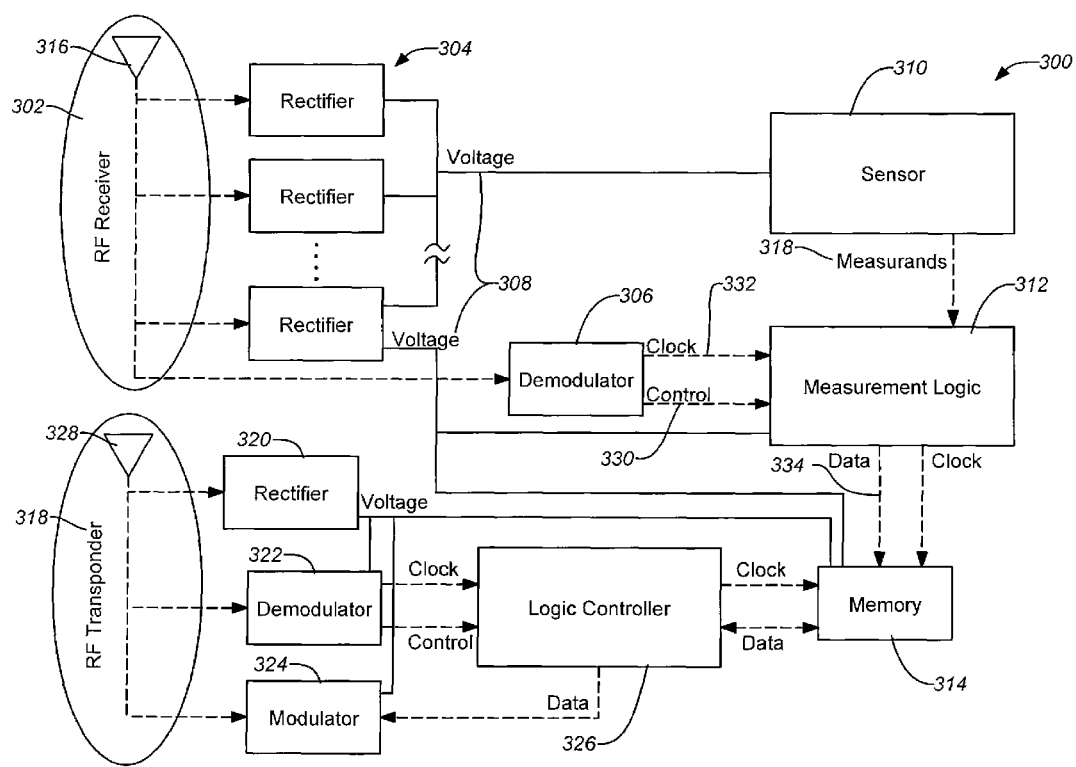
FIG. 3A illustrates a wireless communication tag that may be coupled to a structural sensor.

FIG. 3A illustrates a wireless communication tag 300 that may be coupled to a structural sensor 310. The example wireless communications tag 300 comprises one or more RF receivers 302. The one or more receivers 302 are coupled to a series of rectifier circuits 304 and a demodulator 306. The RF receivers should be designed with one or more resonant frequencies to maximize the excitation of the receiver rectifier circuits and demodulators. Each RF receiver rectifier circuit 304 may be associated with a specific series and/or parallel resonant frequency to maximize signal voltage 308 generated to power necessary sections of the tag and sensor 310 (i.e., the sense loop) during different modes of operation. Voltage 308 from the rectifiers 304 is supplied to the sensor 310 that yields measurands 318 to the measurement logic circuit 312. The clock 302 and control 330 signals from the demodulator 306 are used to control the measurement logic 312 to convert measurands 318 into data 334 transferred to memory 314. The demodulator 306 clock 332 is used to generate the clock signal from the measurement logic 312 for clocking data into memory 314. The clock and control signals from the demodulator 322 are used to control the logic controller 326 to read and write data into memory 314.

The RF receiver 302 may comprise one or more series and/or parallel resonant frequencies for the receiver demodulator 306 to properly control and synchronize the measurement logic 312 and targeted locations of the memory 314. The RF receiver 302 antenna 316 may support a series and parallel resonant frequencies by using a distributed capacitance, inductance, and resistance as known in the art. The RF receiver 302 may be designed to operate using OFDM, CDMA or any other multi-carrier resonant frequencies across the frequency spectrum known in the art. The RF receiver 302 should be designed with safeguard features to ensure inappropriate operations do not occur based on safety requirements.

Figure 3B:
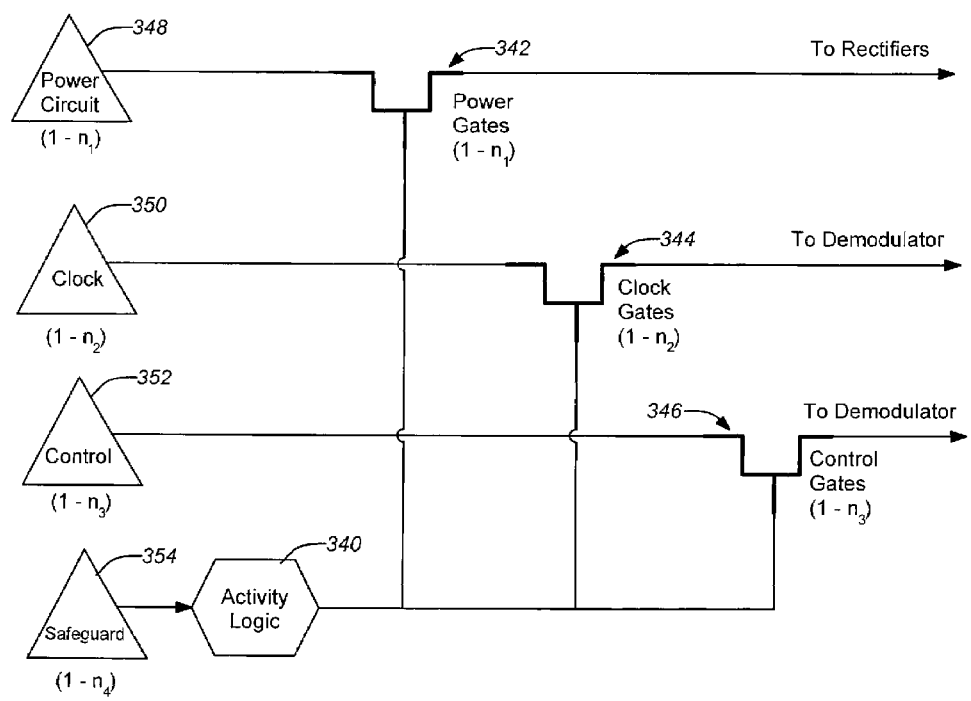
FIG. 3B illustrates an example safeguard feature for an receiver in a wireless communication tag.

FIG. 3B illustrates an example safeguard feature for a receiver 302 (such as the RF receiver 302 of FIG. 3A) in a wireless communication tag 300. Sets of unique resonant frequency (or frequency pattern) inputs 348 ($1-n_1$), 350 ($1-n_2$), 352 ($1-n_3$) are used to respectively direct the power, clock and control of the device. Typically, the sets of power resonant frequency inputs 348 direct the rectifiers (e.g., rectifiers 304 of FIG. 3A), while the the sets of clock and control resonant frequency inputs 350, 352 direct the demodulator (e.g., demodulator 306 of FIG. 3A) of the device. Embodiments of the invention may further implement a safeguard feature for preventing inadvertent activities of the overall device may use a set of safeguard resonant frequency inputs 354 ($1-n_4$) per device. (The safeguard resonant frequency inputs 354 may be either unique resonant frequency patterns or a subset of the frequencies used from the power, clock, and/or control resonant frequencies inputs 348, 350, 352.) The activity logic 340 operates to enable the power, clock and control gates 342, 344, 346, respectively, only when the set of safeguard resonant frequency inputs 354 (e.g., specific frequencies with corresponding amplitudes) meet the required safeguard conditions of the activity logic circuit 340. For example, the activity logic 340 may require specific timing or sequencing of the receiving sets of frequency inputs 348, 350, 352, 354. The safeguard conditions may be statically part of the activity logic circuit 340 or implemented in a way that allows for reconfiguration, e.g., through a programmable element.

Those skilled in the art will appreciate that a similar safeguard architecture can be readily applied for an transponder (such as the RF transponder 318 of FIG. 3A). The RF transponder 318 should be designed with one or more resonant frequencies to maximize the excitation of the one or more transponder rectifier circuits 320, demodulators 322, and modulators 324. The RF transponder 318 may operate using RFID technology known in the art. Each RF transponder rectifier circuit 320 should be associated with a specific series and/or parallel resonant frequency to maximize signal voltage generated to power necessary sections of the tag during different modes of operation. The RF transponder 318 may be designed with one or more series and/or parallel resonant frequencies for the transponder demodulator 322 to properly control and sync the transponder control logic 326 and targeted locations of the memory 314. The RF Transponder 318 should be designed with one or more series and/or parallel resonant frequencies for the transponder modulator 324 to properly generate transmission signals externally to a reader (not shown) through the antenna 328. The RF transponder 318 should include all or a subset of the frequency bands supporting RFID as known in the art. The RF Transponder should be designed with safeguard features to ensure inappropriate operations do not occur based on safety requirements.

Referring back to FIG. 3A, the measurement logic 312 may support the input measurands 318 from the sensor 310 (sense loop), convert the measurand 318 values into a digital format, and write the values into targeted portions of the memory 314 on a data channel 334. The measurement logic 312 may support serial or parallel control 330 and clock 332 signals. The memory 314 may support, at minimum, non-volatile reference information (e.g., identification, encryption key) and non-volatile or volatile value fields (e.g., measurements). Further, the memory 314 may also support serial or parallel reads and writes. All demodulators 306, 322 may provide serial and/or parallel control and clock signals. The logic controller 326 may provide read capabilities of the targeted memory 314 region and simultaneously input into the modulator 324.

It is important to note that the wireless communication tag may be designed to operate with any of the membrane sensors previously described—membrane or gasket membrane sensors for fracture and/or corrosion sensing. Additionally, the wireless communication tag may be designed to operate with any other sensor that may be installed to monitor a structure.

In one example, multiple structural sensors (e.g., gasket corrosion sensors) each have a wireless communication tag are installed in an aircraft structure and employed under an overall testing plan. The sensors are first installed at their various location during the aircraft build. A first reading is performed for all the sensors to validate their functioning and to provide identification and sensor results with a reader device. Following this, the aircraft build is completed and the sensors are then revalidated for functionality. (This sensor installation may occur during the original aircraft build or a retrofit during aircraft maintenance.) The identification and location of the various sensors are recorded. The sensors are next read at a scheduled inspection and any indicated problems repaired. An example reading process is described hereafter.

A wireless reader device is employed to read identification numbers of sensors by transmitting a "ping" to a localized area of the aircraft structure where one or more sensors are installed. Any sensors in the area respond with their identification numbers. The indentification numbers are then cross-referenced to aircraft records to determine the sensor locations. The reader then interrogates all the sensors by transmitting another "ping" to energize sense element circuitry of the sensors. Each sensor tag is powered by the voltage induced in it by the readers transmitted power. The wireless communication tag then verifies that the induced power is within system specifications. An error message is returned to the reader if this fails. If successful, the sense portion of the tag then energizes the conductor sense loop. The sense portion of the tag then reads electrical characteristics of the energized sense loop. The tag then transmits sense element readings to the reader for analysis. The reader then receives the transmitted tag data and compares the values to reference standards for the respective sensors. Finally, the reader displays the inspection results for each sensor. The next regular inspection is scheduled if the result is successful or a repair is scheduled if a failure is indicated.

5. Method of Monitoring Structural Integrity

Figure 4:
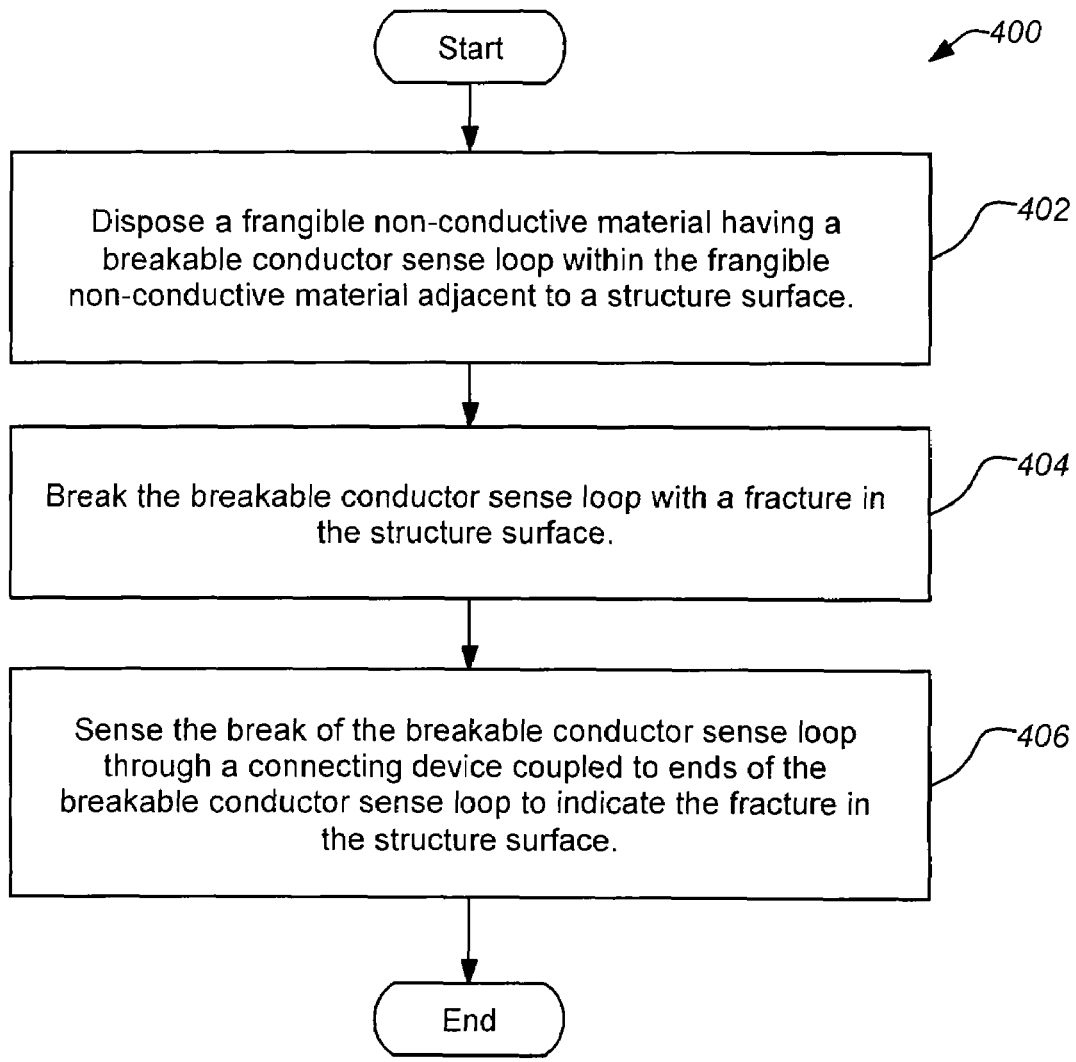
FIG. 4 is a flowchart of a method of sensing a structural fracture.

FIG. 4 is a flowchart of a method 400 of sensing a structural fracture. The method 400 begins with a first operation 402 of disposing a frangible non-conductive material having a breakable conductor sense loop within the frangible non-conductive material adjacent to a structure surface. Next, in operation 404 the breakable conductor sense loop breaks with a fracture in the structure surface. Finally, in operation 406 the break of the breakable conductor sense loop is sensed through a connecting device coupled to ends of the breakable conductor sense loop to indicate the fracture in the structure surface. This method 400 for sensing a structural fracture may be modified consistent with any of the devices or other methods described herein.

Figure 5:
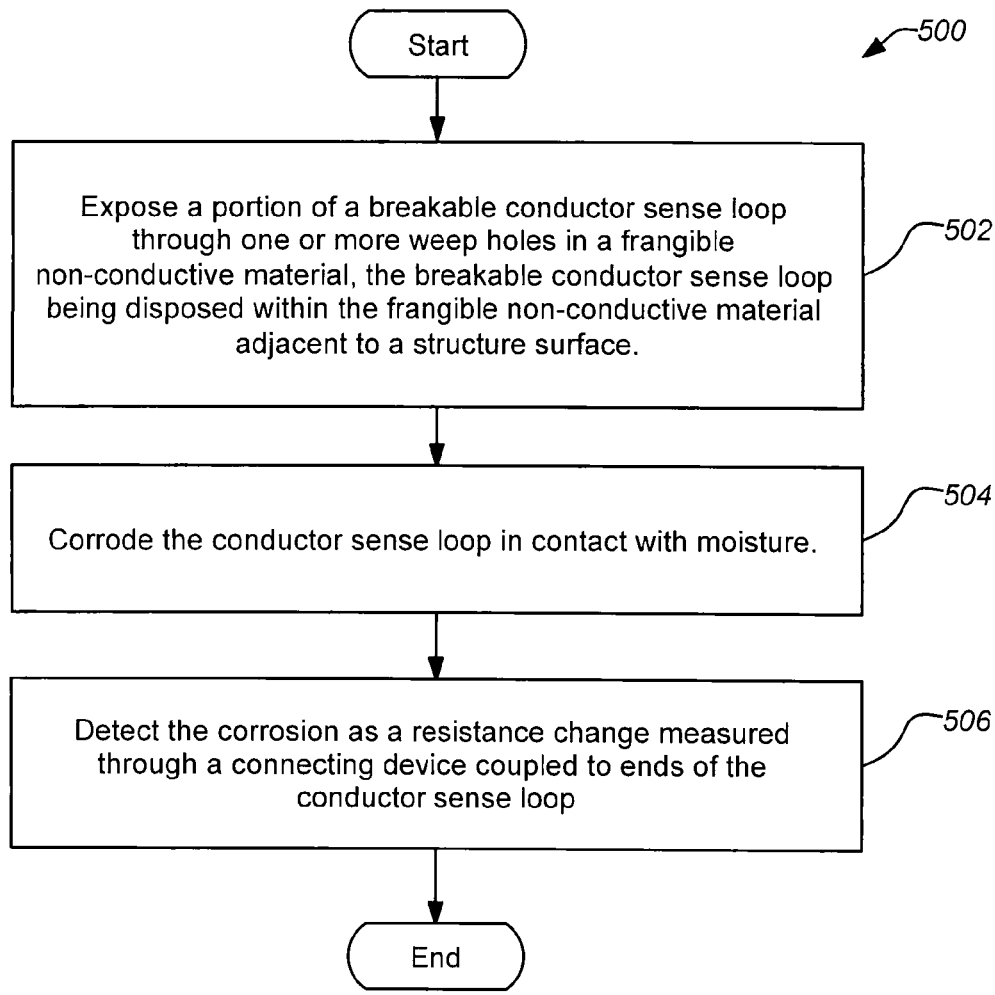
FIG. 5 illustrates another method for sensing corrosion.

FIG. 5 illustrates another method 500 for sensing corrosion. For example, the method 500 begins with the operation 502 of exposing a portion of a breakable conductor sense loop through one or more weep holes in a frangible non-conductive material, the breakable conductor sense loop being disposed within the frangible non-conductive material adjacent to a structure surface. In addition, in operation 504 the conductor sense loop corrodes in contact with moisture. And finally in operation 506 the corrosion is detected as a resistance change measured through the connecting device coupled to the ends of the conductor sense loop. This method 500 for sensing possible structural corrosion may be modified consistent with any of the devices or other methods described herein.

This concludes the description of various embodiments of the present invention. The foregoing description including the described embodiment of the disclosure has been presented for the purposes of illustration and description. It is not intended to be exhaustive or to limit embodiments of the invention to the precise forms disclosed. Many modifications and variations are possible within the scope of the foregoing teachings. Additional variations of the present disclosure may be devised without departing from the inventive concept as set forth in the following claims.

What is claimed is:

1. An apparatus for sensing structural integrity, comprising:
   a frangible non-conductive material;
   a breakable conductor sense loop within the frangible non-conductive material, the sense loop having ends; and
   a connecting device coupled to the ends of the breakable conductor sense loop;
   wherein the frangible non-conductive material is disposed adjacent to a structure surface such that the breakable conductor sense loop is disrupted with a fracture in the structure surface and the disruption is sensed through the connecting device to indicate the fracture in the structure surface and the frangible non-conductive material comprises two layers sandwiching the breakable conductor sense loop.

2. The apparatus of claim 1, wherein the breakable conductor sense loop and the structure surface comprise a common material.

3. The apparatus of claim 1, wherein the frangible non-conductive material further comprises one or more weep holes each exposing a portion of the breakable conductor sense loop.

4. The apparatus of claim 1, wherein the frangible non-conductive material is bonded to the structure surface.

5. The apparatus of claim 1, wherein the frangible non-conductive material is between the structure surface and a second structural surface.

6. The apparatus of claim 5, wherein the frangible non-conductive material comprise one or more sealing ribs against at least one of the structure surface and a second structural surface.

7. The apparatus of claim 1, wherein the connecting device comprises a wireless communications tag.

8. The apparatus of claim 1, wherein the breakable conductor sense loop comprises a section length disposed along an edge of the structure surface.

9. The apparatus of claim 1, wherein the breakable conductor sense loop is routed around a fastener hole in the structure surface.

10. A method for sensing structural integrity, comprising the steps of:
   disposing a frangible non-conductive material having a breakable conductor sense loop within the frangible non-conductive material adjacent to a structure surface;
   disrupting the breakable conductor sense loop with a fracture in the structure surface; and
   sensing the disrupting in the breakable conductor sense loop through a connecting device coupled to ends of the breakable conductor sense loop to indicate the fracture in the structure surface;
   wherein the frangible non-conductive material comprises two layers sandwiching the breakable conductor sense loop.

11. The method of claim 10, wherein the breakable conductor sense loop and the structure surface comprise a common material.

12. The method of claim 10, further comprising exposing a portion of the breakable conductor sense loop through one or more weep holes in the frangible non-conductive material.

13. The method of claim 10, further comprising bonding the frangible non-conductive material to the structure surface.

14. The method of claim 10, further comprising disposing the frangible non-conductive material between the structure surface and a second structural surface.

15. The method of claim 14, wherein the frangible non-conductive material comprise one or more sealing ribs against at least one of the structure surface and a second structural surface.

16. The method of claim 10, wherein the connecting device comprises a wireless communications tag.

17. The method of claim 10, wherein the breakable conductor sense loop comprises a section length disposed along an edge of the structure surface.

18. The method of claim 10, wherein the breakable conductor sense loop is routed around a fastener hole in the structure surface.

* * * * *